Dec. 20, 1949 D. SAMIRAN 2,491,521
FLOAT VALVE FOR FUEL SYSTEMS
Filed Feb. 5, 1946 2 Sheets-Sheet 1

INVENTOR
DAVID SAMIRAN
BY
ATTORNEYS

Dec. 20, 1949  D. SAMIRAN  2,491,521
FLOAT VALVE FOR FUEL SYSTEMS
Filed Feb. 5, 1946  2 Sheets-Sheet 2
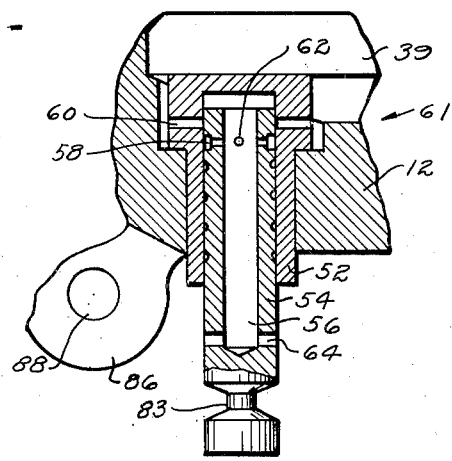
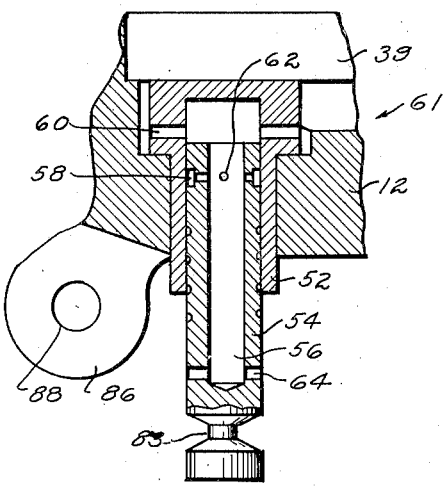
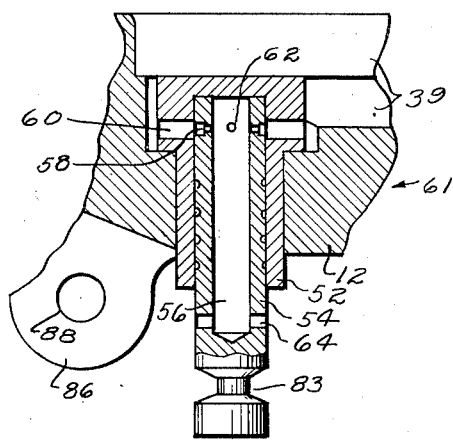
INVENTOR
DAVID SAMIRAN
ATTORNEYS Patented Dec. 20, 1949

2,491,521

UNITED STATES PATENT OFFICE 2,491,521

FLOAT VALVE FOR FUEL SYSTEMS

David Samiran, Osborn, Ohio

Application February 5, 1946, Serial No. 645,694

3 Claims. (Cl. 137—104)

(Granted under the act of March 3, 1883, as amended April 30, 1928; 370 O. G. 757)

The invention described herein may be manufactured and used by or for the Government for governmental purposes without payment to me of any royalty thereon.

This invention relates to float valves and has particular reference to a valve for preventing additional fluid entering a tank when it is already filled to a predetermined level.

An object of the invention is to provide a valve of this kind which depends on the pressure of the incoming fluid to operate it to a closed position, a small auxiliary valve only being operated by a float to direct fluid under pressure to a main valve closing means.

Valves of this character are being employed in fuel tanks for aircraft and such tanks, due to space limitations, may in some cases preferably be replenished from the top downward and in other cases from the bottom upward, and it therefore is another object of the invention to so construct and arrange the valve that it may be used either end up if so desired.

Other objects and advantages will become apparent as the invention is further described, reference being made to the drawings, wherein:

Fig. 2 shows the float actuated auxiliary valve closed as in Fig. 1 but shown to an enlarged scale.

Fig. 3 is a view like Fig. 2 except that the auxiliary valve is in one of its open positions.

Fig. 4 is a view like Fig. 3 except that the auxiliary valve is in the other of its open positions.

Like reference characters refer to like parts throughout the drawings.

Figure 1:
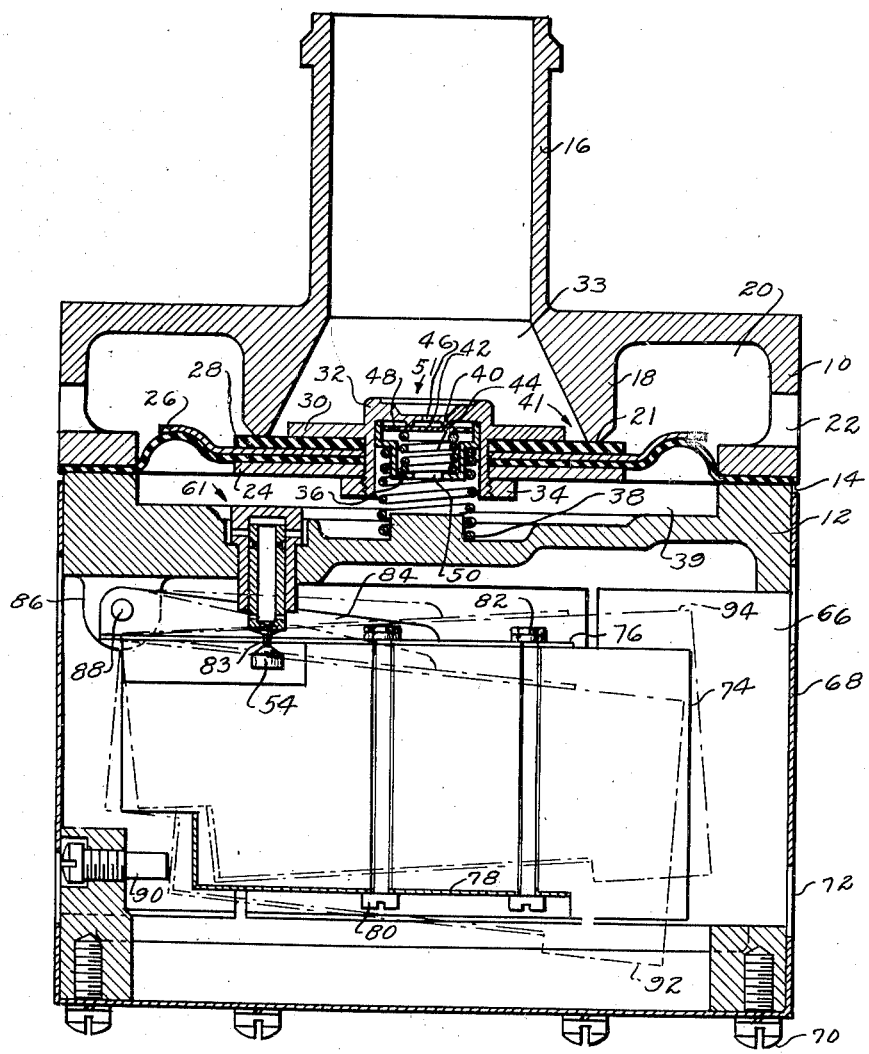
Fig. 1 is a vertical axial section through a float valve made according to my invention showing the float midway of its possible travel, in which position the valve is closed, other positions of the float being shown in phantom.

The float valve selected for illustrative purposes has its housing in two parts 10 and 12 with a diaphragm 14 clamped therebetween by means of screw (not shown). A hose connection 16 and a central hub 18 are integral with the upper part 10. An annular space 20 surrounds the hub 18 and has a series of radial openings 22 connecting the annular space 20 to the outside of the housing. A main valve seat 21 is formed on the lower end of the hub 18.

The diaphragm 14 is held between washers 24 and 26, while a main valve seat washer 28 is held between washer 26 and a flange 30. Flange 30 is carried on an externally threaded hollow hub 32 and a nut 34 clamps parts 24, 14, 26, 28, and 30 together. The space 33 is separated from the annular space 20 when the main valve seat washer 28 is on its seat 21, as shown in Fig. 1.

Within the hollow hub 32 is a flanged cup 36 and surrounding this cup is a spring 38, the lower end of which rests on the housing 12 and the upper end of which bears against the underside of the flange of the cup. The spring 38 is under sufficient stress to press the main valve seat washer 28 lightly against the seat 21 when the valve is not operating. In operation, however, the main valve seat washer 28 seats only when the pressure in the space 33 above the main valve and the pressure in the space 39 below the main valve is equalized. In that case the pressure, acting over a much greater area in the chamber 39 than in the space 33, is sufficient to hold the main valve seat washer 28 on its seat 21. The main valve assembly may be broadly designated by the numeral 41.

Formed within the hollow hub 32 is a check valve seat 40 against which a check valve seat washer 42 is held by a spring 44. A depression in the bottom of the cup 36 holds the spring 44 concentrically positioned. A small port 46 in the closed end of the hollow hub 32 connects the space 33 above the main seat washer 28 to the space 39 below it when the check valve seat washer 42 is off its seat 40. Holes 48 and 50 through the check valve seat washer 42 and through the bottom of the cup 36 respectively permit fluid to pass through from the space 33 to the space 39 when the check valve seat washer 42 is off its seat 40. The small spring 44 is of sufficient strength to hold the check valve seat washer 42 on its seat 40 lightly, but cannot hold the check valve closed against the pressure in the space 33 except when sufficient pressure also exists in the chamber 39. The check valve may be broadly designated by the numeral 51.

In the bottom of the lower housing part 12 is a piston valve, which is shown to a larger scale in Figs. 2, 3, and 4. The piston valve comprises a bushing 52 which is closed at the upper end and press fitted into the housing and a lap fitted piston 54 which is slidable in the bushing. An axial passageway 56 extends from one end into the piston 54 and an annular groove 58 surrounds the piston. Radial holes 60 extend through the head of the bushing for establishing communication between the chamber 39 and the groove 58, and radial holes 62 connect the groove 58 to the axial passageway 56. Other radial holes 64 connect the axial passageway to the float chamber 66. The assembled bushing 52 and piston 54 and their several passageways comprise the piston valve which may be broadly designated by the numeral 61.

A protective cover 68 surrounds the float chamber 66 and is held on by screws 70. Openings 72 connect the inside of the float chamber to the space surrounding it. A float 74 preferably made of cork or similar material is reinforced top and bottom by plates 76 and 78 held on by bolts 80 and nuts 82. A neck 83 near the end of the piston 54 fits into a slot in the plate 76, whereby swinging of the float about the hinge pin 88 raises and lowers the piston 54 in its bore in the bushing 52. A hinge bracket 84 is integral with the plate 76 and is hinged by a pin 88 to an ear 86 which depends from the housing part 12. Downward swinging of the float 74 is limited by contact with the screw 90 while upward swinging is arrested by engagement of the end of the piston 54 with the closed end of the bushing 52.

The operation of the valve is substantially as follows:

When the fuel is at the desired level in a tank equipped with my float valve, the valve will appear as in Fig. 1, i. e., the float 74 will be at the midway position, whereby the piston valve will be closed as seen in Fig. 2. Fuel under pump pressure in the space 33 will pass through the check valve 51 into the chamber 39 to keep the main valve 41 closed.

When, however, the level of the fuel in the tank drops until the float assumes the position 92, the piston valve 61 will be in one of its open positions as seen in Fig. 3. In this position the piston valve 61 will drain fuel from the chamber 39 faster than it can be supplied through the check valve 51, whereupon the main valve 41 will open and allow the fuel level to rise in the tank until the float again assumes the position seen in Fig. 1, in which position the piston valve 61 and the main valve 41 are closed.

When the valve is being used in the inverted position and the fuel in the tank has dropped below the desired level, the float will be arrested in the position 94 by reason of the piston 54 encountering the closed end of the bushing 52 as seen in Fig. 4 and the piston valve will be open as shown. The fluid under pressure in the space 39 again drains from the space 39 through the piston valve 61 faster than it can be replenished through the check valve 51, whereupon the main valve 41 opens. Fuel will then flow through the main valve until the float rises to the level position at which the piston valve will be closed as in Fig. 2 and the main valve will be closed thereby.

It will be seen that, whether the device is upright or inverted, whenever the float 74 is in the horizontal or midway position of its travel, the main valve 41 will be closed, and it should not open again except upon the dropping of the float one way or the other from the midway position. It has been found, however, that when the pressure in the space 33 is being supplied by a pump which is considerably lower than the fuel level in the tank, and pumping is momentarily interrupted, the syphoning effect of the column of fluid between the tank and pump would, in the absence of the check valve 51, suck the fluid from the chamber 39 and open the main valve 41 regardless of the midway position of the float 74. It will be apparent, therefore, that the function of the check valve 51 is to make sure that a momentary drop in pressure in the space 33 will not open the main valve 41 when the float 74 is at the midpoint or valve closing position.

Having described my invention, I claim:

1. Float controlled valve mechanism comprising a main valve adapted at its inlet side to receive a fluid under pressure, means associated with said main valve actuable by inflow of fluid under pressure to close said main valve, a passageway adapted to convey fluid under pressure from the inlet side of said main valve to the inflow side of said pressure closing means, a float actuated valve associated with said pressure closing means adapted when opened to drain fluid from said pressure closing means faster than it may be renewed by way of said passageway, and a float adapted, at its normal or medial position, to hold said float actuated valve closed and above or below said medial position to hold said float actuated valve open, whereby said valve mechanism may be used either in the upright or in the inverted position.

2. Float operated valve mechanism which comprises a main valve seat, a main valve closing disc having one side engageable with said seat, fluid pressure actuated means adapted to engage said disc with said seat against incoming fluid under pressure, a leakage opening through said disc in the path of the incoming fluid for supplying fluid to said pressure actuated means for operating said pressure actuated means for engaging said disc with said seat, a float actuated valve adapted when open to drain fluid from said fluid pressure actuated means faster than it may be renewed through said leakage opening, and a float associated with said float actuated valve movable upward or downward to actuate said float actuated valve and operative upon a predetermined upward or downward movement to open said float actuated valve, thereby to allow said main valve closing disc to be disengaged from said main valve seat.

3. A float controlled valve mechanism which comprises a housing, a partition extending across the inside of said housing, a diaphragm extending across the inside of said housing above said partition and enclosing a pressure tight chamber between said partition and said diaphragm, a main valve closing disc carried on the upper side of said diaphragm, a valve seat in said housing adapted to be closed by said disc when said diaphragm is raised by pressure within said chamber, the area within said valve seat being materially less than the area of diaphragm exposed to said chamber, a leakage passageway connecting the space within said seat to said chamber, a float operated valve adapted when open to drain fluid under pressure from said chamber faster than it may be replenished through said leakage opening, and a float, adapted in a medial position to maintain said float operated valve closed, and in positions above and below said medial position to keep said float operated valve open.

DAVID SAMIRAN.

REFERENCES CITED

The following references are of record in the file of this patent:

UNITED STATES PATENTS

| Number | Name | Date |
|---|---|---|
| 269,886 | Semple | Jan. 2, 1883 |
| 925,538 | Weaver | June 22, 1909 |
| 1,333,646 | Watrous | Nov. 16, 1920 |
| 1,397,711 | Alpine | Nov. 22, 1921 |
| 1,603,240 | Gregory | Oct. 12, 1926 |
| 1,889,304 | Zerbi | Nov. 29, 1932 |
| 1,937,044 | Miller | Nov. 28, 1933 |
| 2,143,204 | McCormack | Jan. 10, 1939 |
| 2,211,237 | Langdon | Aug. 13, 1940 |